(12) United States Patent
Matsuba et al.

(10) Patent No.: US 7,079,918 B2
(45) Date of Patent: Jul. 18, 2006

(54) SYSTEM FOR ADJUSTING POSITION OF GLASS PLATES

(75) Inventors: Tomoki Matsuba, Mie (JP); Yukiyasu Ozaki, Mie (JP)

(73) Assignee: Central Glass Company, Limited, Ube (JP)

( * ) Notice: Subject to any disclaimer, the term of this patent is extended or adjusted under 35 U.S.C. 154(b) by 102 days.

(21) Appl. No.: 10/939,344

(22) Filed: Sep. 14, 2004

(65) Prior Publication Data

US 2006/0058905 A1   Mar. 16, 2006

(51) Int. Cl.
*C03B 23/025* (2006.01)
(52) U.S. Cl. .......................... 700/157; 65/106; 65/107; 65/111; 65/160; 198/844.1
(58) Field of Classification Search ................ 700/157; 65/106, 107, 111, 160; 198/844.1
See application file for complete search history.

(56) References Cited

U.S. PATENT DOCUMENTS 4,133,667 A * 1/1979 Nitschke ...................... 65/163
2002/0152769 A1* 10/2002 Vehmas et al. ................ 65/104
2002/0179416 A1* 12/2002 Hoffmann et al. ........ 198/844.1
2004/0007020 A1* 1/2004 Kanno et al. ............... 65/29.11
2004/0107729 A1* 6/2004 Fukami et al. ............... 65/25.4

* cited by examiner

*Primary Examiner*—Leo Picard
*Assistant Examiner*—Michael D. Masincik
(74) *Attorney, Agent, or Firm*—Crowell & Moring LLP

(57) ABSTRACT

A system for adjusting position of glass plates includes (1) a chain for conveying glass plates into a bending furnace, the chain having (a) alternate links, (b) connecting pins for holding the alternate links together, (c) extension pins extending from some of the connecting pins toward the corresponding glass plates; (2) supporting members fixed to the extension pins, for supporting the glass plates and for guiding the glass plates into the bending furnace; (3) a first image sensor unit for imaging actual positions of the extension pins; (4) a processor for computing a difference between the actual position of each extension pin and a reference position of each extension pin; and (5) a display device for displaying a command to adjust position of each extension pin, based on the difference, to make each extension pin take the reference position, thereby adjusting position of the glass plates.

7 Claims, 5 Drawing Sheets

SYSTEM FOR ADJUSTING POSITION OF GLASS PLATES

BACKGROUND OF THE INVENTION

The present invention relates to a system for adjusting position of glass plates, which are conveyed into a bending furnace (equipped with hearth beds) in the production of curved glass plates for vehicular and industrial uses, and to a method for adjusting position of such glass plates using the system.

In the case of bending window glasses for vehicles such as automobiles, it is possible to use various bending methods depending on dimensions and shapes of glass plates. In particular, in the case of producing automotive side window glasses, it is common to use a bending furnace with hearth beds due to its very high productivity.

SUMMARY OF THE INVENTION

It is an object of the present invention to provide a system and a method for easily and quickly adjusting position of glass plates.

According to the present invention, there is provided a system for adjusting position of glass plates. This system comprises:

a chain for conveying glass plates into a bending furnace, said chain having (a) alternate links, (b) connecting pins for holding the alternate links together, and (c) extension pins extending from some of the connecting pins toward the corresponding glass plates;

supporting members fixed to the extension pins, for supporting the glass plates and for guiding the glass plates into the bending furnace;

a first image sensor unit for imaging actual positions of the extension pins;

a processor for computing a difference between the actual position of the extension pin and a reference position of the extension pin; and a display device for displaying a command to adjust position of the extension pin, based on the difference, to make the extension pin take the reference position, thereby adjusting position of the glass plates.

According to the present invention, there is provided a method for adjusting position of glass plates by the system. This method comprises the steps of:

(a) imaging the actual positions of the extension pins by the first image sensor;

(b) computing the difference between the actual position of the extension pin and the reference position of the extension pin; and (c) displaying on the display device a command to adjust position of the extension pin, based on the difference, to make the extension pin take the reference position, thereby adjusting position of the glass plates.

DETAILED DESCRIPTION

With reference to FIGS. 1–7, a system and a method for adjusting position of glass plates according to the present invention are exemplarily described in detail in the following.

Figure 4:
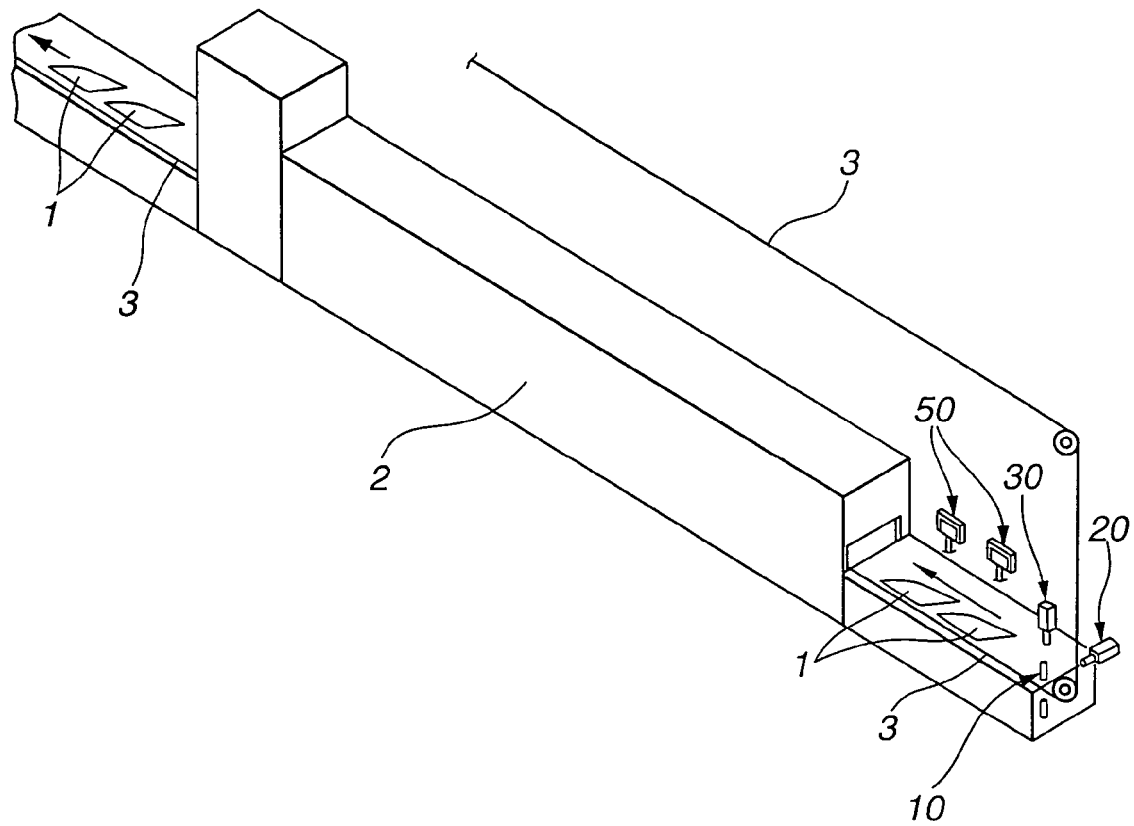
FIG. 4 is a schematic perspective view showing the entirety of the system together with the bending furnace.

As is seen from FIG. 4, flat glass plates 1 are conveyed in a direction along the arrow in FIG. 4 into a bending furnace 2. This bending furnace 2 has a plurality of hearth beds, over which glass plates 1 are conveyed. Each hearth bed is made of a refractory material and has many small holes on its top surface. Compressed air or gas is discharged from the holes of the hearth beds. With this, it is possible to convey glass plates 1 under a floating condition. In order to convey glass plates 1 with a stable position, glass plates 1 are downwardly slightly inclined relative to a transverse direction of the hearth beds that is perpendicular to the conveyance direction of glass plates 1. Under this condition, the floating glass plate 1 is moved toward a chain 3 to bring it into abutment with a set of supporting members (flights) 5. With this, the glass plates 1 are supported by the supporting members 5 and guided into the bending furnace 2.

Figure 1:
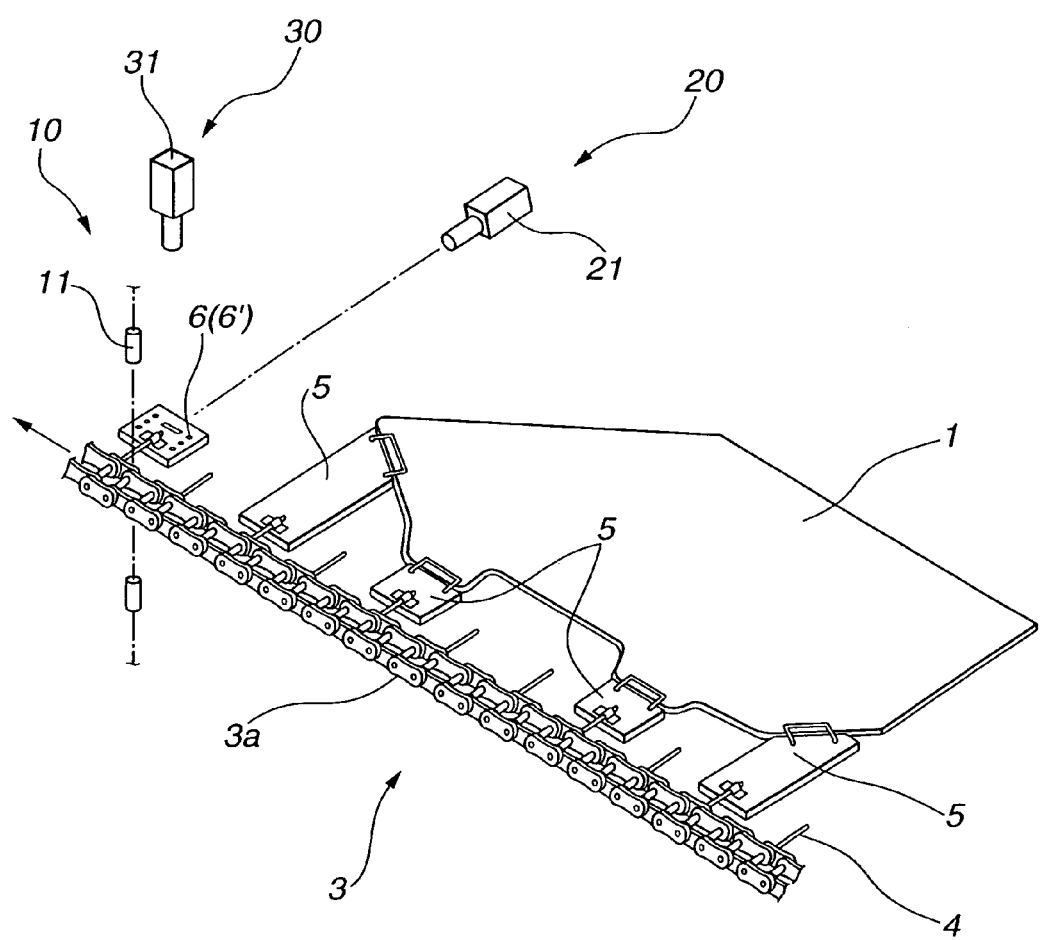
FIG. 1 is a perspective view showing a part of the system for adjusting position of glass plates according to the present invention, whereby a glass plate is supported by a set of supporting members before the glass plate enters into a bending furnace.
Figure 3:
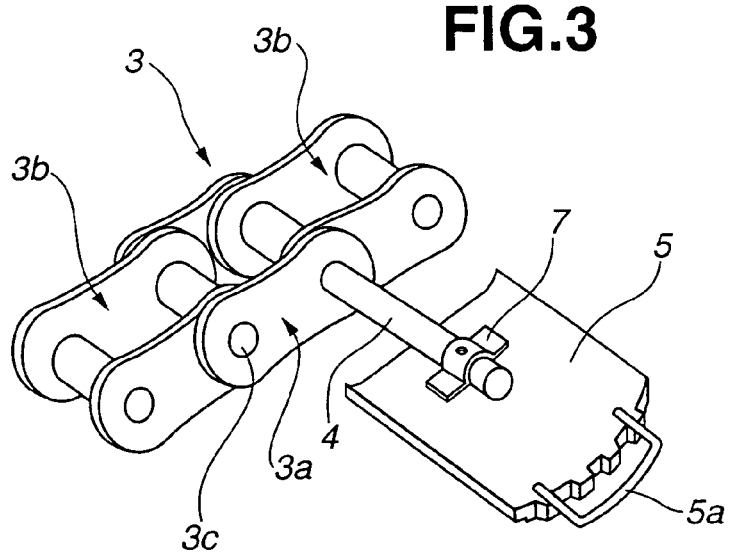
FIG. 3 is a view similar to FIG. 2, but showing a supporting member fixed to an end of an extension pin.

As is seen from FIGS. 1 and 3, the supporting members 5 for supporting lower edges of glass plates 1 are fixed to end portions of some of extension pins 4 that are attached to the chain 3 at regular intervals. For example, two to five supporting members 5 (four in FIG. 1) may be used for supporting one glass plate 1. These supporting members 5 can be counted as one set, and a plurality of sets of supporting members 5 are attached to the chain 3 having a loop shape (see FIG. 4), for continuously supporting glass plates 1.

Each glass plate 1 is supported by a set of supporting members 5 only by an abutment of a lower edge of the glass plate with leading edges of the supporting members 5. When the glass plates 1 are changed from one type to another type (e.g., automotive side window glass having a complex shape), it may be necessary to adjust the positions of the extension pins 4 (attached to the supporting members 5) by suitably bending these extension pins 4 to have desired angles in order that the supporting members 5 surely support the glass plates 1. Furthermore, it is optional to provide supporting members having different sizes in order to securely support each glass plate having a complex shape as shown in FIG. 1. In an earlier technology, this bending was conducted by a manual operation of operator with operator's experience and sense. In other words, the positions (angles) of the extension pins attached to the supporting members were not numerically managed in the earlier technology. Thus, the position (posture) of glass plates may have too much variation.

In contrast with the above-mentioned earlier technology, it is possible by the present invention to easily and quickly adjusting position (posture) of glass plates without depending on operator's experience and sense, as explained in detail in the following.

As is seen from FIG. 4, the chain 3 has a shape of closed loop, partly received in a heating furnace (bending furnace) 2, and is arranged to run along one sidewall of the heating furnace 2. By driving the chain 3, glass plates 1 are introduced into the heating furnace 2, then passed therethrough, for example, to suitably bend them, and then withdrawn therefrom to the next step.

As is seen from FIG. 3, the chain 3 has (a) outer and inner links (alternate links) 3a and 3b that are alternately arranged, (b) connecting pins 3c for holding the alternate links together, and (c) extension pins 4 extending from some of the connecting pins 3c toward the corresponding glass plates 1 (see FIG. 1). A set of supporting members 5 is attached to end portions of the predetermined extension pins 4 with fasteners 7 in a manner to surely support the glass plate 1, as shown in FIG. 1.

As is seen from FIG. 1, the extension pins 4 are formed on the chain 3 at regular intervals and may be formed of a heat-resisting alloy (e.g., stainless steel) rod having a diameter of, for example, about 8 mm. As stated above, when the glass plates 1 have been changed from one type to another type, it may be necessary to suitably bend certain extension pins 4 at their midway positions to adjust the angle θ that is defined between the axis A of the unbent base portion of the extension pin and the axis of the bent top portion of the extension pin. With this, it is possible to bring a set of the supporting members 5 into a secure abutment with each glass plate 1 to stably support each glass plate 1.

As is seen from FIG. 3, each supporting member 5 is brought at its uneven leading edge into abutment with the corresponding glass plate 1 to prevent the glass plate from moving in horizontal directions. Each supporting member 5 has a wire member 5a that can prevent upward movement (floating) of the glass plate.

Figure 7:
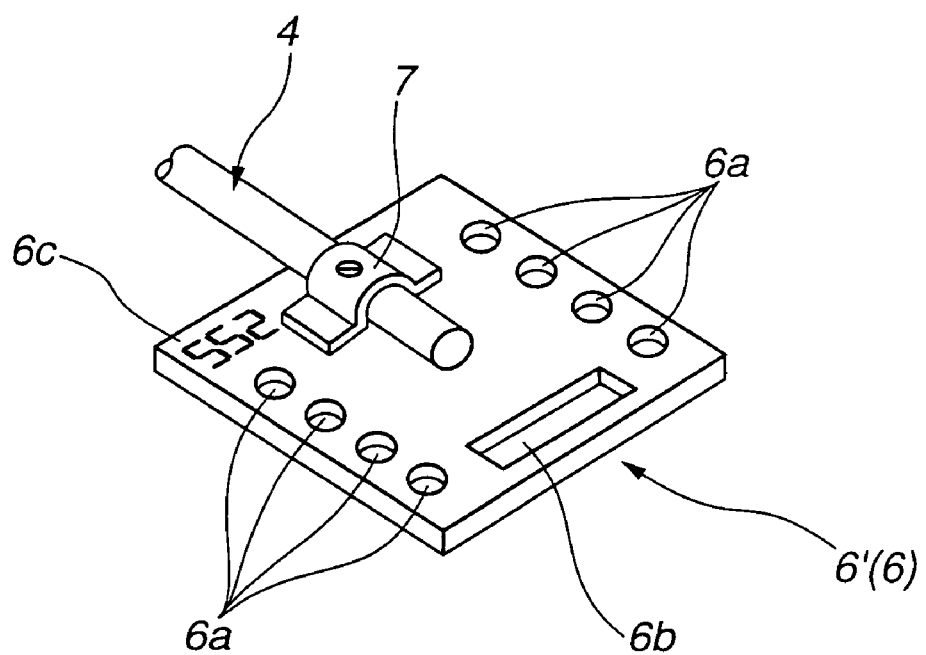
FIG. 7 is a perspective view showing a tag having a rectangular slit and eight circular holes punched therethrough.

As is seen from FIGS. 1 and 7, a tag 6 (6') is fixed to an extension pin 4 through a fastener 7 to have a position that is near to and ahead (downstream) of a set of supporting members 5 in the conveyance direction of the glass plates 1.

The tag 6 is a metal plate and is indicative of a location of a set of predetermined extension pins 4 attached to a set of the supporting members 5. In other words, the tag 6 is indicative of the predetermined order of a set of the extension pins attached to a set of the supporting members 5. For example, in the case of FIG. 1, the tag 6 is indicative of a location information that the second, fourth, seventh and ninth extension pins have respective supporting members 5, if the extension pin immediately upstream of the tag 6 is counted as the first extension pin. It should be noted again that the extension pins 4 are arranged at regular intervals. In other words, the tag 6 is indicative of the timings when the above-mentioned predetermined extension pins (attached to a set of the supporting members 5) come to a predetermined position, that is, the position of the first image sensor (a pin imaging sensor) 20 for imaging the actual positions of the predetermined extension pins.

The above-mentioned location information is stored in a controller (e.g., sequencer and computer). The controller can receive signals from various sensors, can send commands of the camera shutter timing to various image sensors, can receive data obtained by a binarization of image data (taken by a CCD camera or the like) with an image processor, can control display of the difference between the actual positions and reference positions of the above-mentioned predetermined extension pins, and can store reference data, setting data and the like.

As is seen from FIGS. 1 and 4, the system may have an extension pin detecting means 10 (an optical sensor unit 11) that provides a vertical light. When the extension pin blocks this light, its arrival is detected by the optical sensor unit 11.

Furthermore, the system may have a tag detection means 30 (a second image sensor unit 31) having a CCD camera or the like for imaging the tags and the supporting members 5. The second image sensor unit 31 is capable of separating or distinguishing the tag 6 (6') and the supporting member 5 from each other, as explained in the following.

For example, as shown in FIG. 7, the tag 6 (6') may have a slit 6a. Thus, the second image sensor unit 31 can detect the tags 6 by the presence of the slit 6b. In contrast, it can detect the supporting members 5 by the absence of the slit 6b. When the second image sensor unit 31 has detected the tag 6, the number of the extension pins 4 that passes the position of the optical sensor unit 11 is counted. Based on the above-mentioned location information of the predetermined extension pins 4 having the corresponding supporting members 5, when each of such extension pins (the second, fourth, seventh and ninth extension pins in FIG. 1) reaches a predetermined position, the actual position of the extension pin is imaged by a CCD camera 21 of the pin imaging sensor 20 (see FIGS. 1 and 2). In other words, the image of the circular edge of the extension pin is taken by the CCD camera 21 fixed at a predetermined position.

As is seen from FIG. 7, the tag 6 (6') may be formed with a plurality of slits and/or through holes 6a. In fact, the tag may have a plurality of areas, each of which is hollow or solid by punching or not punching a hole through the tag. For example, the tag shown in FIG. 7 has eight circular areas, all of which are hollow by punching circular holes therethrough. Thus, it is possible to number, distinguish or identify each tag 6 (6') by the presence or absence of the hole at each area. By imaging with the tag detection means 30, it is possible to not only distinguish the tags from the supporting members, but also recognize the original number of each tag 6 (6') by the presence or absence of the hole at each area of the tag.

As mentioned above, the tag shown in FIG. 7 has eight circular areas 6a, all of which are hollow by punching circular holes therethrough. In case that one area of the tag is solid, it is possible to put 0. In contrast, in case that one area of the tag is hollow, it is possible to put 1. Thus, it is possible to provide 8-bit information by the eight circular areas 6a. In other words, it is possible to number the tags from No. 1 to No. 256 (since $2^8$=256). The numeral 6c (No. 255) according to decimal number system is also shown on the tag of FIG. 7 such that an operator can also easily identify the tag.

The tags are preferably made of a heat resistant metal, since they pass through the furnace 2.

It is possible to store information, such as the position of a set of the supporting members 5, which is immediately upstream of the tag, the angles of the extension pins having these supporting members 5, and the like, per tag, in the sequencer or computer. Furthermore, it is possible to manage quality information of each glass plate 1 corresponding to the tag having a particular number, if such quality information of each glass plate 1 per tag is stored in the sequencer or computer.

It is optional to attach the tag 6, not the supporting member 5, to a base portion of the extension pin 4 such that the light of the optical sensor unit 11 is also blocked by the tag 6 upon moving the chain 3. In this case, the optical sensor unit 11 can detect each extension pin 4 when the light is blocked for a first period of time and can detect each tag 6 when the light is blocked for a second period of time that is longer than the first period of time. Furthermore, the optical sensor unit 11 can distinguish the tag from the supporting member, if the supporting member 5 is not attached to a base portion of the extension pin 4.

Figure 2:
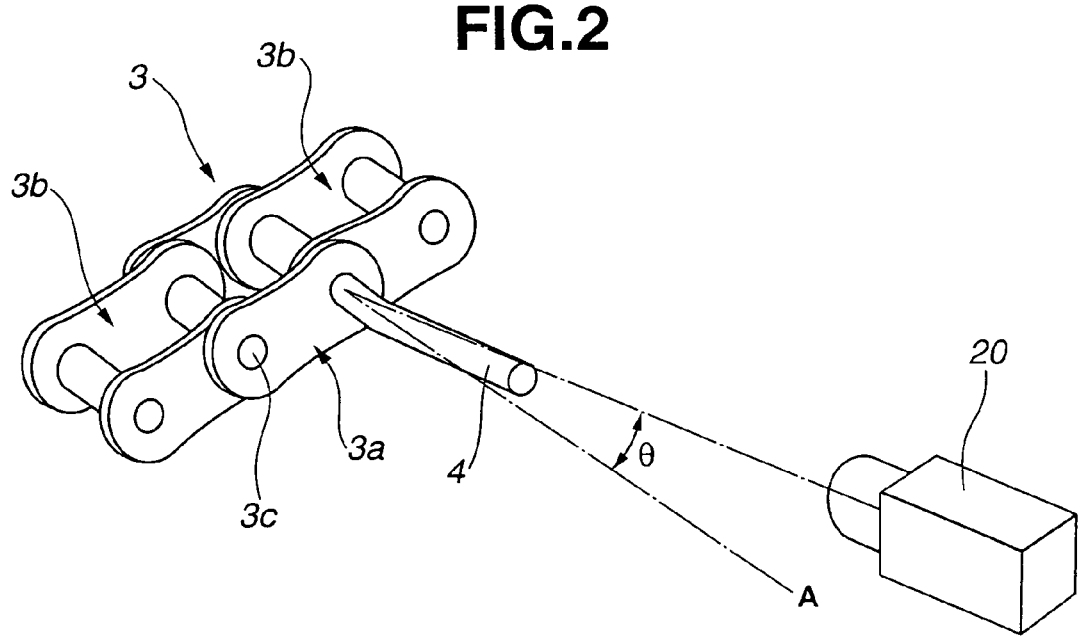
FIG. 2 is an enlarged partial view showing a condition in which the actual position of an extension pin is imaged by a first image sensor in accordance with the present invention.

As is seen from FIGS. 1 and 2, the pin imaging sensor 20 images the position (posture) of the extension pins 4 having thereon the supporting members 5, in the direction along an imaginary line extending straight from the connecting pin 3c of the chain 3. In fact, the pin imaging sensor 20 images the circular edge of the extension pin 4 to determine the difference between the actual position of the circular edge of the extension pin and a reference position thereof. In other words, it is possible by the image to determine how much and in which direction the extension pin is bent. The reference position is set by teaching.

It is preferable to place the CCD camera 21 at a position that is somewhat higher than that of the circular edge of the extension pin 4 such that the CCD camera 21 can image the circular edge even if the extension pin 4 is bent in a direction in which the supporting member 5 interferes with the imaging of the CCD camera 21.

It should be noted that the unbent base portion of the extension pin 4 is at a level that is the same as that of circular edges of the connecting pins 3c adjacent to the extension pin 4. Thus, it is possible to determine X-coordinate and Y-coordinate of each of the actual position of the circular edge of the connecting pin 3 and the actual position of the circular edge of the extension pin 4 by imaging these circular edges at the same time. Similarly, it is possible to determine X-coordinate and Y-coordinate of the reference (target) position of the circular edge of the extension pin 4. By computing the respective differences between X-coordinate and Y-coordinate of the actual position and those of the reference position of the circular edge of the extension pin, it is possible to issue a command how much and in which direction the circular edge of the extension pin should be moved, thereby making the circular edge of the extension pin take the reference position.

The image data of the extension pins taken by the CCD camera may be subjected to binarization with an image processor. The resulting data in terms of X-coordinates and Y-coordinates are sent to the processor (e.g., a sequencer or computer).

The processor computes the difference (along X-axis and Y-axis) between the data of the actual position of the circular edge of the extension pin and the data of the reference position of the circular edge of the extension pin. Then, a command (see FIGS. 5 and 6) to make the extension pin take the reference position in a manner to cancel the difference may be shown in a display device 50. Based on this command, the operator can easily, correctly and numerically adjust the position of the extension pin, while watching a display screen 51 of the display device 50. This adjustment may be conducted manually or using a tool(s) according to need. With this, it is possible to adjust position of the supporting members. Thus, it is possible to bring the supporting members into a proper abutment with the glass plate 1. Consequently, it is possible to properly bend the glass plates 1 in the bending furnace 2, as originally designed.

As is seen from FIG. 4, the display device 50 may be disposed at a position immediately upstream of an entrance of the furnace 2.

Figure 5:
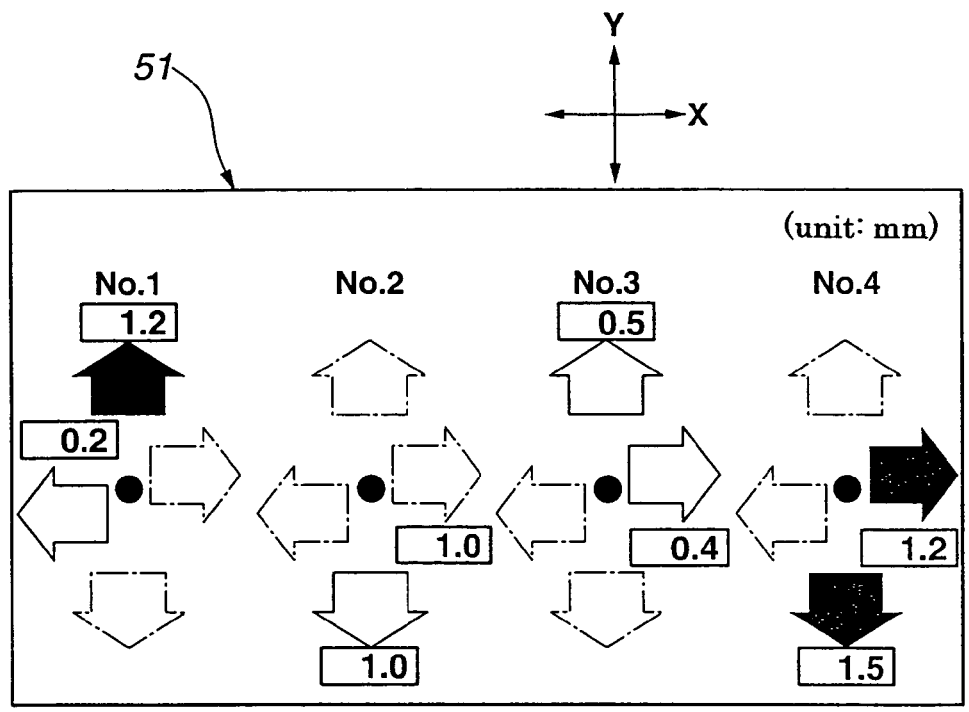
FIG. 5 is a plan view showing one way of a command, displayed on a display device, to adjust position of each extension pin.

As is seen from FIG. 5, the display screen 51 shows how much a set of the four extension pins having thereon the corresponding four supporting members should be bent along X-axis and Y-axis in order that these extension pins take their respective reference positions. If the moving distance along X-axis or Y-axis is within a permissible variation, it may be indicated by an arrow of green color. If it is slightly greater than that, it may be by an arrow of yellow color. If it is much greater than that, it may be by an arrow of red color. The indication with such different colors makes it easy for the operator to do the adjustment of the extension pins.

For example, the display screen 51 shows that the extension pin of No. 1 should be bent in a manner to move its circular edge 0.2 mm along X-axis leftward and 1.2 mm along Y-axis upward. As mentioned above, the movement of 0.2 mm along X-axis may be shown by an arrow of green color, and the movement of 1.2 mm along Y-axis may be shown by an arrow of red color.

Figure 6:
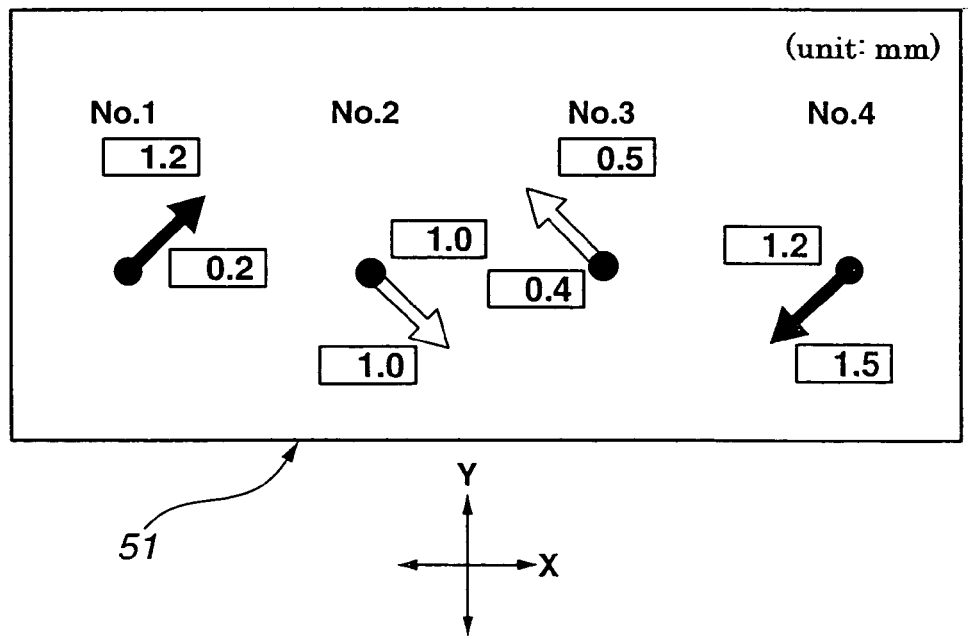
FIG. 6 is a view similar to FIG. 5, but showing another way of the command.

The two arrows as shown in FIG. 5 may be combined into one arrow, as shown in FIG. 6. It is, however, preferable that the moving distance is indicated along X-axis and Y-axis separately.

As is seen from FIG. 4, the first and second image sensor units 20, 30 and the optical sensor unit 10 may be disposed upstream of a place (in front of the display device 50) where an operator adjusts the position of the extension pins.

Operation of the system is explained in detail, as follows.

If it is scheduled to produce again one type of glass plates (having particular dimensions) in the future, it is preferable to store a reference data (e.g., data as to which extension pins have thereon the supporting members if counted from the tag and data as to the positions of such extension pins) in the processor for the future use. With this, it is possible to retrieve such reference data to produce the same type of glass plates.

In operation to adjust the position (posture) of the extension pins, the tags and the supporting members are attached to the predetermined extension pins, while glass plate is not set at a predetermined position at which the glass plate is in abutment with a set of supporting members. Then, under a condition that the chain is driven at a rate lower than that of normal operation, the operator adjusts the extension pins by suitably bending them in accordance with a command of the display screen 51 of the display device 50 (see FIGS. 5 and 6), as explained as above.

As is seen from FIG. 4, immediately after the operator adjusts the position of a set of extension pins, those extension pins are introduced into the furnace 2. Then, the operator has to adjust at once the position of the next set of extension pins. Thus, the adjustment may be conducted gradually by driving the chain two or three rotations to complete the adjustment.

Whether or not the position of the extension pins has been properly adjusted can be checked by bringing a glass plate into abutment with the supporting members attached to those extension pins. If this abutment is proper, it is possible to consider that the reference data (command) and the adjustment are proper. If the abutment is not proper, it is possible to conduct the adjustment again by suitably bending the extension pins to achieve a proper abutment. After that, the reference data can be updated accordingly.

A final check as to whether or not the position of the extension pins has been properly adjusted can be conducted by actually introducing glass plates into the furnace 2 at a normal operational speed of the chain 3.

As stated above, it is possible to store in the processor the reference data of each set of extension pins corresponding to each tag having a particular number. Thus, when a glass plate has failed in an inspection before shipment, it is possible to identify or track and then adjust a set of the extension pins corresponding to the glass plate. With this, it is possible to easily conduct a good quality control of glass plates.

What is claimed is:

1. A system for adjusting position of glass plates, comprising:
    a chain for conveying glass plates into a bending furnace, said chain having (a) alternate links, (b) connecting pins for holding the alternate links together, and (c) extension pins extending from some of the connecting pins toward the corresponding glass plates;
    supporting members fixed to the extension pins, for supporting the glass plates and for guiding the glass plates into the bending furnace;
    a first image sensor unit for imaging actual positions of the extension pins;
    a processor for computing a difference between the actual position of the extension pin and a reference position of the extension pin; and
    a display device for displaying a command to adjust position of the extension pin, based on the difference, to make the extension pin take the reference position, thereby adjusting position of the glass plates.

2. A system according to claim 1, wherein each glass plate is supported and guided by a set of the supporting members under a condition that the glass plate is floated by upwardly discharging an air or gas toward the glass plate and that the glass plate is in abutment with the set of the supporting members by downwardly inclining the glass plate toward the set of the supporting members.

3. A system according to claim 1, further comprising:
    tags fixed to some of the extension pins, each tag being indicative of a location of a set of the extension pins that are upstream of the tag and that have the corresponding support members for supporting the corresponding glass plate, each tag and each extension pin having first and second widths respectively along a longitudinal direction of the chain, the first width of each tag being longer than the second width of each extension pin; and
    an optical sensor unit for providing a light at a position where the light is blocked by the extension pins and the tags when the chain is driven, said optical sensor unit detecting each extension pin when the light is blocked for a first period of time and detecting each tag when the light is blocked for a second period of time that is longer than the first period of time.

4. A system according to claim 1, further comprising:
    tags fixed to some of the extension pins, each tag being indicative of a location of a set of the extension pins that are upstream of the tag and that have the corresponding support members for supporting the corresponding glass plate, each tag being formed with a slit; and
    a second image sensor unit for imaging the tags and the supporting members, said second image sensor unit being capable of distinguishing the tag and the supporting member from each other by the presence or absence of the slit.

5. A system according to claim 1, further comprising:
    tags fixed to some of the extension pins, each tag being indicative of a location of a set of the extension pins that are upstream of the tag and that have the corresponding support members for supporting the corresponding glass plate, each tag having a plurality of areas, each area being hollow or solid by punching or not punching a hole through the tag; and
    a second image sensor unit that is capable of imaging the tags to detect the tags and capable of imaging the areas of each tag to identify each tag by the presence or absence of the hole at each area.

6. A method for adjusting position of glass plates by a system, said system comprising:
    a chain for conveying glass plates into a bending furnace, said chain having (a) alternate links, (b) connecting pins for holding the alternate links together, (c) extension pins extending from some of the connecting pins toward the corresponding glass plates;
    supporting members fixed to the extension pins, for supporting the glass plates and for guiding the glass plates into the bending furnace;
    a first image sensor unit for imaging actual positions of the extension pins;
    a processor for computing a difference between the actual position of the extension pin and a reference position of the extension pin; and
    a display device for displaying a command to adjust position of the extension pin, based on the difference, to make the extension pin take the reference position, thereby adjusting position of the glass plates, said method comprising the steps of:
    (a) imaging the actual positions of the extension pins by the first image sensor;
    (b) computing the difference between the actual position of the extension pin and the reference position of the extension pin; and
    (c) displaying on the display device a command to adjust position of the extension pin, based on the difference, to make the extension pin take the reference position, thereby adjusting position of the glass plates.

7. A method according to claim 6, wherein said system further comprises:
    tags fixed to some of the extension pins, each tag being indicative of a location of a set of the extension pins that are upstream of the tag and that have the corresponding support members for supporting the corresponding glass plate, each tag and each extension pin having first and second widths respectively along a longitudinal direction of the chain, the first width of each tag being longer than the second width of each extension pin; and
    an optical sensor unit for providing a light at a position where the light is blocked by the extension pins and the tags when the chain is driven, said optical sensor unit detecting each extension pin when the light is blocked for a first period of time and detecting each tag when the light is blocked for a second period of time that is longer than the first period of time, and
    wherein, after each tag is detected by the optical sensor, the step (a) of said method is conducted by imaging the actual positions of the extension pins placed at the location.

* * * * *